United States Patent
Starkey

(10) Patent No.: US 6,872,069 B2
(45) Date of Patent: Mar. 29, 2005

(54) EJECTOR SLEEVE FOR MOLDING A RAISED APERTURE IN A MOLDED ARTICLE

(76) Inventor: Glenn Starkey, 25942 W. Ravine Dr., North Barrington, IL (US) 60047

( * ) Notice: Subject to any disclaimer, the term of this patent is extended or adjusted under 35 U.S.C. 154(b) by 0 days.

(21) Appl. No.: 10/049,756

(22) PCT Filed: Jun. 19, 2001

(86) PCT No.: PCT/US01/19744

§ 371 (c)(1),
(2), (4) Date: Feb. 12, 2002

(87) PCT Pub. No.: WO01/98056

PCT Pub. Date: Dec. 27, 2001

(65) Prior Publication Data

US 2003/0012844 A1 Jan. 16, 2003

Related U.S. Application Data

(60) Provisional application No. 60/212,248, filed on Jun. 19, 2000.

(51) Int. Cl.$^7$ ............................................. B29C 45/40
(52) U.S. Cl. ...................... 425/556; 425/444; 264/334; 264/336
(58) Field of Search ............................... 425/444, 556; 264/334, 336

(56) References Cited

U.S. PATENT DOCUMENTS

| | | |
|---|---|---|
| 3,342,917 A | 9/1967 | Laskiewicz ................. 264/109 |
| 4,050,666 A | 9/1977 | Van Tichelt ................. 249/68 |
| 5,644,833 A | 7/1997 | Starkey |
| 5,868,978 A | 2/1999 | Kadoriku et al. ........... 264/40.5 |
| 5,980,236 A * | 11/1999 | Gellert et al. ................ 425/549 |
| 6,345,974 B1 * | 2/2002 | Kawasaki et al. .......... 425/149 |
| 2002/0018825 A1 | 2/2002 | Starkey |

OTHER PUBLICATIONS

Misumi Corp. Catalogue, 1992 pp. 171–172 & 903–904 Misumi Corp. Tokyo, Japan.

Hasco Catalogue, 2002, Extension Rod Page Hasco Hasenclever GmbH & Co. KG.

* cited by examiner

Primary Examiner—Tim Heitbrink

(57) ABSTRACT

The present invention includes an improved ejector sleeve (5) having thinner side-walls than prior sleeves. The sleeves generally include a ring (31) for mounting the sleeve, a central bore (42) for receiving a core pin (1), a tube portion extending from the ring to a tube end portion. The side-walls defining the tube end portion have a thickness of less than forty thousandths, and preferably thirty thousandths of an inch. Preferably, the coated ejector sleeve is provided in which a thin, lubricous coating of nickel, chromium or alloys of chromium or nickel is applied to at least a portion of the sleeve. The coating is applied in thickness of less than 0.0001 inch which improves the wear characteristics of the pins and sleeves as well as allowing the coated pins and sleeves to be stocked and used as nominal thickness parts.

17 Claims, 6 Drawing Sheets

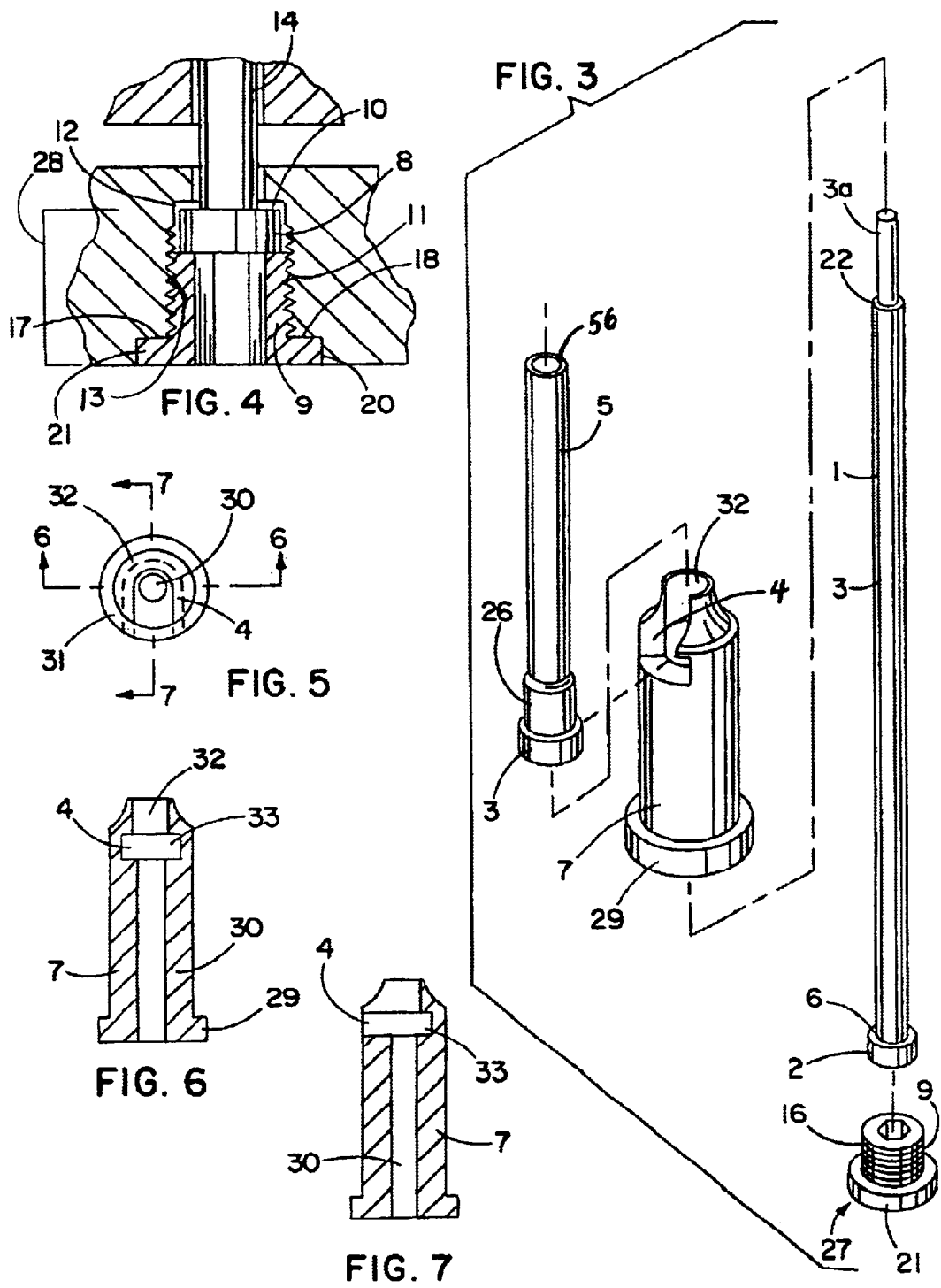

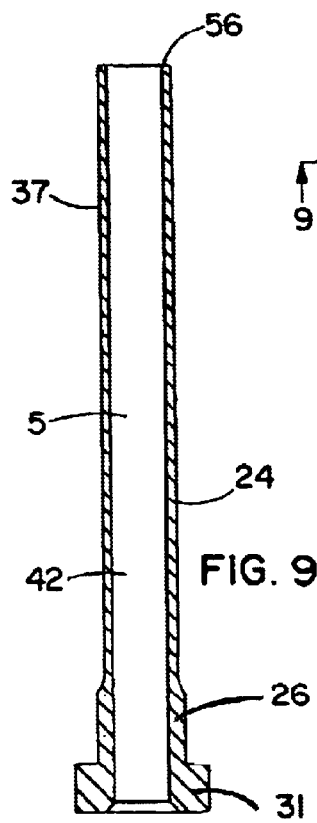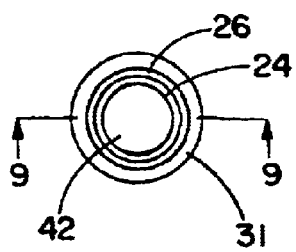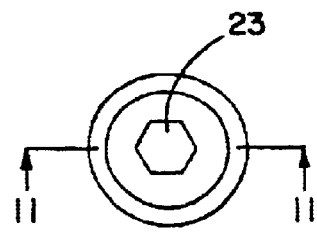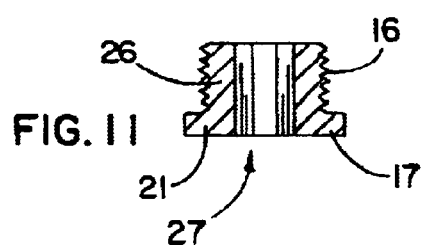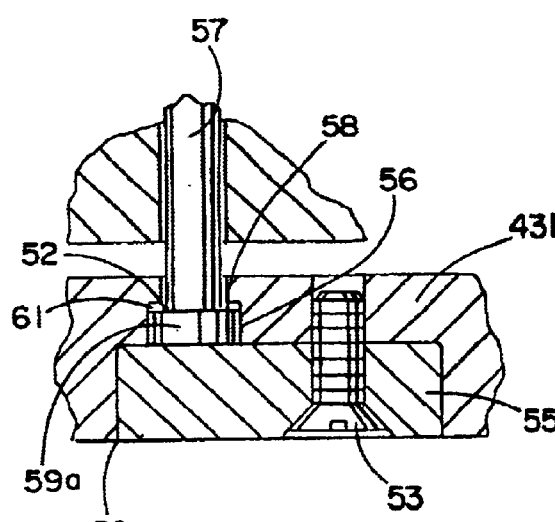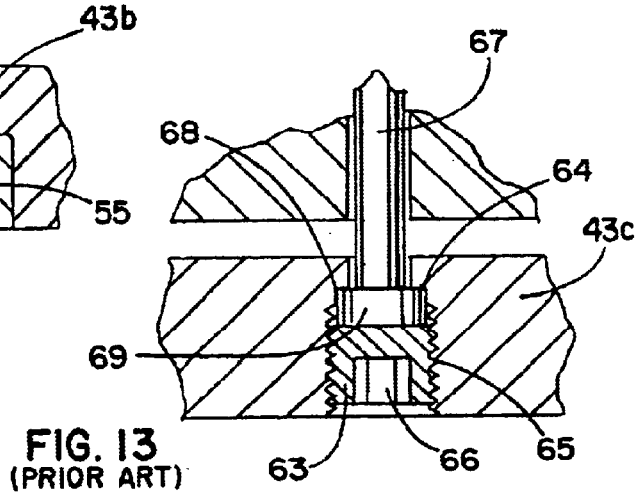
FIG. 8
FIG. 9
FIG. 10
FIG. 11
FIG. 12 (PRIOR ART)
FIG. 13 (PRIOR ART)

EJECTOR SLEEVE FOR MOLDING A RAISED APERTURE IN A MOLDED ARTICLE

This application claims benefit of national stage application PCT/US01/19744 filed Jun. 19, 2001 which claims benefit of provisional application No. 60/212,248 filed Jun. 19, 2000.

FIELD OF THE INVENTION

The invention generally relates to injection mold core pins and sleeves, which are used to form cored holes in articles formed by injection molding. More particularly, the invention relates to a core pin system including an improved thin walled sleeve, which preferably is used with an improved core pin retainer.

BACKGROUND

In injection molding, upper and lower mold halves are brought together to define a mold cavity into which heated molten plastic is injected under pressure. The mold halves are typically vertically aligned with an upper mold portion termed the cavity half and a lower mold portion termed the core mold half. For forming holes or apertures through the top or bottom surfaces of molded pieces, coring elements, such core pins are frequently utilized. When a raised aperture having side walls extending from the surface of the molded part is desired, the core element is often provided with an associated ejector sleeve which assists in forming a lip of the raised aperture and in breaking the plastic part free from the coring element to eject the part as the mold is opened.

Core pins are long, thin, metallic or ceramic cylinders which have a base with a head and shoulder portion adapted to assist in retaining the pin in the mold section or press piece. The pin's tip, which extends into the mold cavity, may be machined to a smaller diameter which forms a shoulder and is typically drafted so that the pin is tapered at the end to assist in ejection. The sleeve is typically a hollow tube sized to fit over the pin which has a base portion having head and shoulder portions for retention in a counterbore formed in the ejector plate. Core pins are typically mounted in the core mold half. When mounted, the pin extends through an aperture formed in the mold half and into the mold cavity.

In forming a raised aperture, the interior surface or side walls of the aperture are defined by the surface of the core pin, the lip of the raised aperture is defined by the core pin ejector sleeve (hereinafter "sleeve") and optionally a machined shoulder on the core pin, and the exterior surface of the side walls of the aperture are defined by the core mold half.

The diameter and shape of the interior of the raised aperture is determined by the mold's end user by machining the diameter and shape of the end of the core pin and thickness of the sleeve as desired to correspond to the raised aperture's intended purpose. For example, if the raised aperture is placed in the molded article in order to receive a ⅛th screw, the diameter of the pin must be approximately ⅛th, approximately cylindrical in shape and within acceptable tolerances. The width of the side walls of the raised aperture is determined by the width of the sleeve and the cross-sectional diameter of the shoulder aperture in the mold. The width of the walls of the hole formed in the molded article is set by the end user by considering a number of factors, including the strength and rigidity of the plastic used to form the article.

Given the long, slender shape of the pin and sleeve, the core pin and sleeve can become broken or bent during installation or during the molding cycle. This damage may occur when the sleeve or molded article catch upon the sides of the aperture or are not properly positioned when the mold is closed. When the pin or ejector sleeve are damaged, the mold may become jammed and the mold machine must be taken off-line, disassembled and repaired. At the very least, this repair requires that the broken core pin be replaced, while loose fragments of the broken pin and/or molded articles must be removed. These repairs increase the maintenance costs for the injection mold machine and cause the mold's end user to lose valuable production time.

Another problem with prior core pins and sleeves is that when the molded article is ejected from the mold, the walls of the hole formed in the article can suffer fracture or defect due to adhesion of uncured plastic to the mold, core pin or sleeve. This damage can be due to the side walls having insufficient time to cure or cool during the mold cycle. One way to reduce molding cycle time is to reduce the thickness of the side wall of the raised aperture. In hot plastic and thermosetting plastic mold injection, any increase in the amount of plastic used to form a raised aperture also increases the cooling/setting cycle time for the mold, wherein the plastic cools and hardens to gain sufficient rigidity to prevent fracture or deformation prior to ejection. The more material used, the longer it takes to cool sufficiently. Even a small increase in cycle time per piece can become a significant manufacturing cost when considering the number of articles being produced. Thus, it is generally recognized as desirable to decrease the side wall thickness of a raised aperture. Decreasing the width of the walls in turn decreases the amount of plastic used to fill the mold cavity and form the raised aperture. Even if this amount is negligible when viewed on a per/piece or per hole amount, since the number of pieces produced by a given mold can range into millions, and since there are often multiple raised apertures formed per molded article any decrease in materials used can result in significant cost savings for the end user.

Standard sleeve thicknesses for stock sleeves have commonly ranged from about 0.046 to about 0.125 inch which can form a raised aperture with side-wall thickness ranges from 0.046 to 0.125 inches. The foregoing advantages have resulted in mold users seeking to use thinner sleeves to make raised apertures with the same internal diameter, but with thinner side walls. However, mold component manufacturers have been reluctant to provide thinner sleeves due to their perceived fragility, particularly when the end user wants a sleeve of considerable length, e.g. a sleeve that is more than four inches long. In order to decrease the thickness of the side-wall of a raised aperture while maintaining the same dimension for its inner diameter, a thinner sleeve is required.

The fragility of current injection mold core pin and sleeves can be exacerbated by the manner in which the pin is mounted. In one common type of mount, a threaded retaining bolt is used to secure the pin base to a press piece of the core mold half. The core pin base typically includes a broadened head and shoulders. A threaded mounting aperture is formed in the press piece to receive the base of the pin and retaining bolt. The retaining bolt is threaded into the mounting aperture so that the shoulder on the base of the pin is held flush against the top surface of the mounting aperture. This results in the mounting shoulder of the core pin being held tight against the interior surface of the press piece. Such a rigid hold on the base of the pin does not allow for any movement of the pin or sleeve relative to the molded part which can cause the pin and/or sleeve to be damaged during ejection of the part.

To alleviate the problems with rigid mounting, a second type of mount for core elements has been used which employs a separate mounting plate. The separate mounting plate is held in place by a separate mounting screw or bolt. The plate holds the pin in place, but with head clearance between the pin head and the press piece which allows the core pin and sleeve to move or float in its mounting. Such movement helps prevent damage to the pin and sleeve if the pin or sleeve should catch upon the molded part of a portion of the mold during travel. However, this type of plate mount suffers from several drawbacks. For example, a relatively large rectangular aperture is typically required to be machined or milled into the exterior surface of the press piece to accommodate the mounting plate. The aperture for retaining the core pin head also has to be machined into the mold, as does a separate mounting hole for the bolt or screw which holds the mounting plate in place. Finally, a hole must also be machined into the mounting plate itself to correspond to the hole in the mold where the screw or bolt joins the plate and mold. This process adds several additional machining steps to the design and manufacture of the injection mold thereby increasing the mold's production cost. Further, since useable space for fitting required components on a mold is usually limited, the floating mount plate is often viewed as an inefficient use of that available space on the mold.

Another problem with prior ejector sleeves was that they become worn quicker than is desirable by friction between the exterior surface of the sleeve and the mold base as well as between the interior surface of the sleeve and the exterior surface of the core pin. Thus, there is a need for a core pin and core pin sleeve which have improved wear characteristics.

Thus, there is a need for a more robust, thin walled sleeve which can be more easily installed and which can be used to form a thin walled raised apertures in injection molded articles thereby reducing cycle time and providing a savings on material costs.

SUMMARY OF THE INVENTION

The present invention includes an improved ejector sleeve having thinner side-walls than prior sleeves. The sleeves generally include a ring for mounting the sleeve, a central bore for receiving a core pin, a tube portion extending from the ring to a tube end portion. The side-walls defining the tube end portion have a thickness of less than forty thousandths, and preferably thirty thousandths of an inch. These thinner side-walls allow the end user to manufacture molded articles with raised apertures having the same interior diameter and thinner aperture side-walls. This results in decreased costs due to reduced mold cycle times as well as cost savings due to material reduction.

In one preferred aspect of the invention, a coated ejector sleeve is provided in which a thin, lubricous coating of nickel, chromium or alloys of chromium or nickel is applied to at least a portion of the sleeve. A similar coating is also preferably applied to the pin. The coating is applied in thickness of less than 0.0001 inch which improves the wear characteristics of the pins and sleeves as well as allowing the coated pins and sleeves to be stocked and used as nominal thickness parts. Such coated pins and sleeves have demonstrated improved wear resistance as well as lesser susceptibility to failure during operation in a mold.

In one embodiment of the invention, a sleeve extension is provided which has a base portion adapted to mount to an ejector plate. The sleeve extension preferably has a T-slot on the end opposite the base for receiving amounting base of an ejection sleeve. The sleeve extension includes a through bore dimensioned to receive a core pin. The sleeve extension provides structural support for long, thin walled sleeves thereby allowing the use of longer stock ejector sleeves with decreased side-wall thickness.

In another embodiment of the invention, an improved core element mounting system is provided which allows for greatly simplified installation of a floating core mount. The mounting system of the invention provides sufficient head clearance that the core pin and sleeve adjust or deflect away from the sides of the mold without breaking. The system utilizes a novel plug which includes a threaded exterior surface, a plug shoulder for engaging a stop surface of a bore formed in the mold, a driving surface for engagement with a driving tool, and a head contacting surface for supporting the head of the core pin. The mounting system can be installed in a single aperture which can be machined in three steps. These steps may include machining a core element bore, machining wider bore which is dimensional to receive and engage the plug body and to have sufficient depth to accommodate the core pin head and provide head clearance, and machining a still wider bore which is dimensioned to receive the shoulders of the plug.

BRIEF DESCRIPTION OF THE DRAWINGS

FIG. 3 is an exploded view of the core ejector sleeve, the sleeve extension, ejector sleeve, and mounting plug of FIG. 1.

FIG. 4. is a cross-sectional view of the mounting plug and core pin seated in a press piece in accordance with one embodiment of the invention.

FIG. 5 is an axial view of a ejector sleeve extension in accordance with one embodiment of the invention.

FIG. 6 is a cross-sectional view of the ejector sleeve extension of FIG. 5 taken along lines 6—6.

FIG. 7 is a cross-sectional view of the ejector sleeve extension taken along lines 7—7 of FIG. 5.

FIG. 8. is a top axial view of the ejector sleeve in accordance with one embodiment of the invention.

FIG. 9 is a cross-sectional view of the core ejector sleeve taken along lines 9—9 of FIG. 8.

FIG. 10 is a top axial view of the mounting plug in accordance with one embodiment of the invention.

FIG. 11 is a cross-sectional view of the mounting plug taken along lines 11—11 of FIG. 10.

FIG. 12 is a cross-sectional view of a prior art core pin mounting system.

FIG. 13 is a cross sectional view of another type of prior art core pin mounting system.

DETAILED DESCRIPTION OF THE INVENTION

Figure 1:
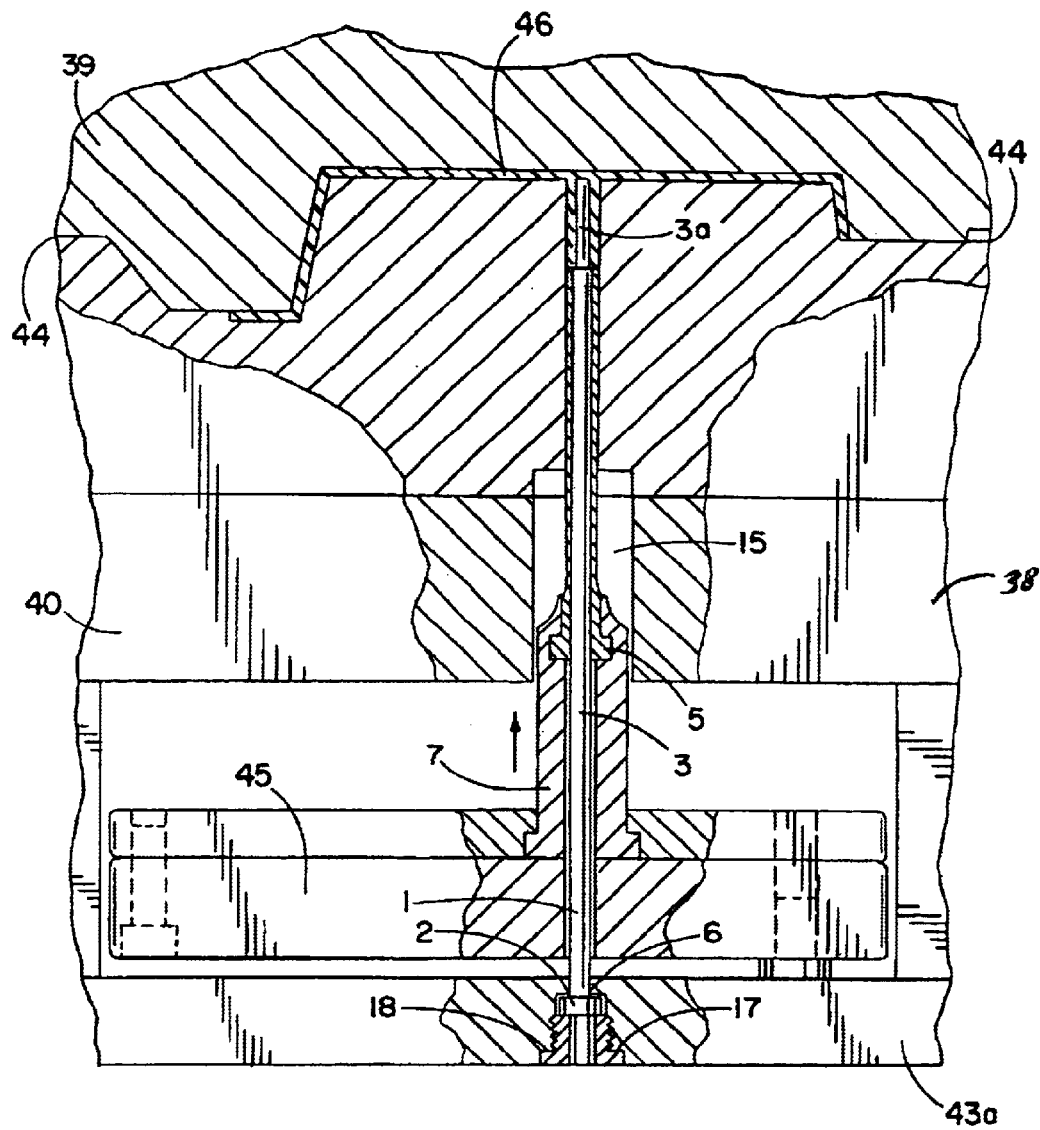
FIG. 1 is a cross-sectional view of the pin, ejector sleeve and sleeve extension assembled within a closed injection mold in accordance with one embodiment of the invention.
Figure 2:
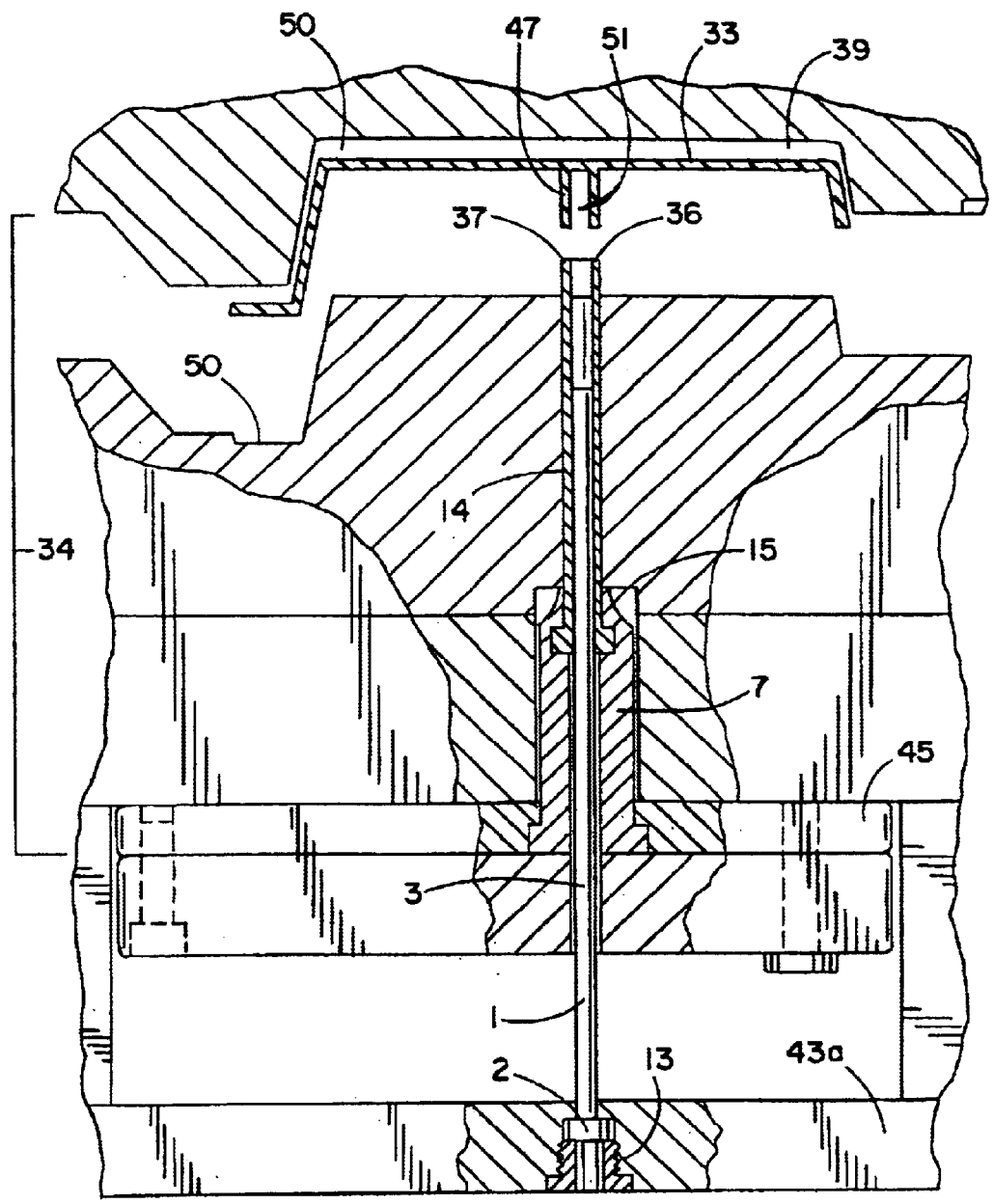
FIG. 2 is a cross-sectional view of the pin, sleeve and sleeve of FIG. 1 shown during the ejection cycle of the injection mold process with the mold halves partially opened.

The thin wall sleeves of one embodiment of the invention are shown mounted to an injection mold in FIGS. 1 and 2. As can be seen with referenced to these figures, core pin 1 extends through ejector plate 45, ejector sleeve extension 7 and ejector sleeve 5. The assembly of these pieces is best depicted in FIG. 3, which is an exploded view of these pieces. Ejector sleeve 5 is mounted through the T-slot 4 provided in the side of ejector sleeve extension 7. The core pin 1 is threaded through ejector sleeve extension 7 and ejector sleeve 5 and held in place by the mounting plug 9. As depicted in FIG. 3, the core pin 1 has a pin head 2, a shaft 3 having a first diameter and, as shown, may have a shaft end 3a which is machined by the end user to have a smaller diameter than the diameter of the shaft 3. The change in diameter between the pinhead 2 and shaft end 3a forms a pin shoulder 22 around the exterior surface of the pin 1.

As can be seen in FIGS. 1 and 2, the mold 38 including cavity half 39 and core half 40, a press piece 43a, an ejector plate 45, and the molded article 46. The mold halves 39 and 40 define a mold cavity 50 where they meet along part line 44. The molded article 46 is formed to have an aperture having an interior cavity 51 which is encompassed by a aperture wall 47, with the wall having an inner and outer circumference (not numbered) and lip 36.

Figure 14:
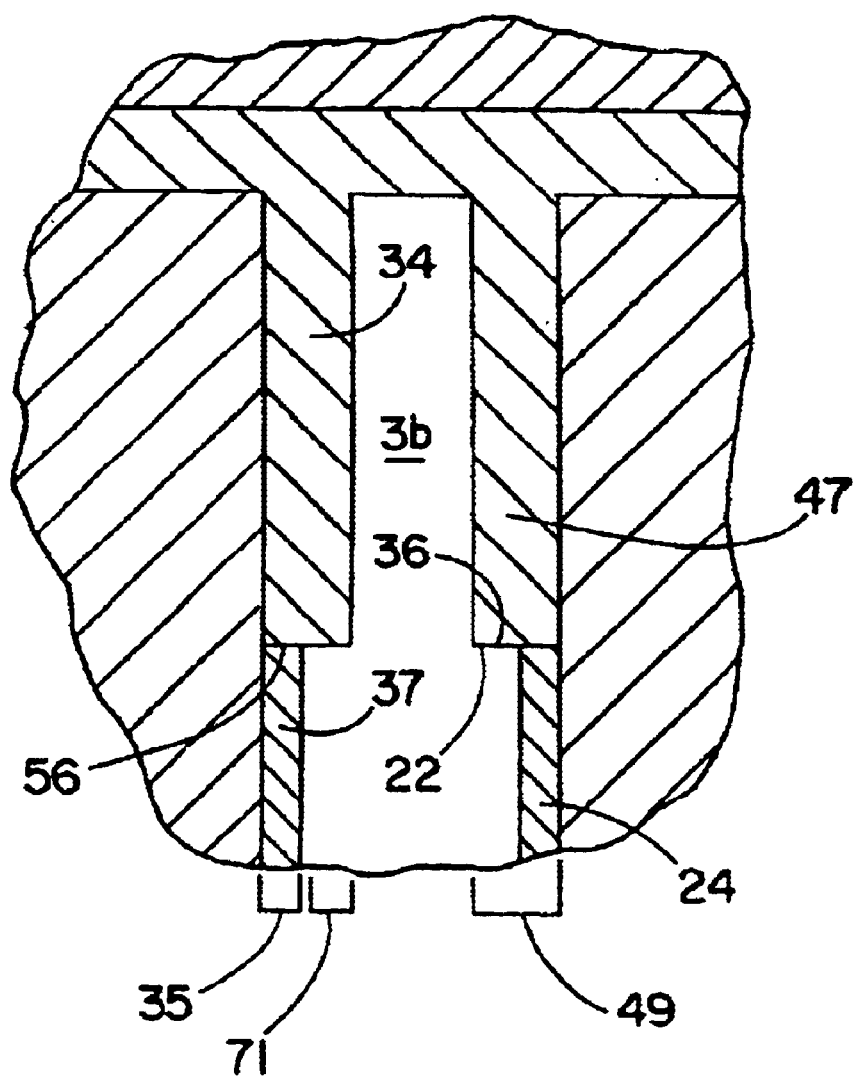
FIG. 14 is an enlarged cross-sectional view of the core pin tip, thin wall sleeve and molded article in accordance with one embodiment of the invention.

As best seen in FIG. 9, the sleeve 5 has a lower mounting ring 31 and a hollow sleeve 37. The lower mounting ring 31, as can be seen in FIG. 3, is dimensioned to be slotted through T-slot 4 into the extension recess 33 in the ejector sleeve extension 7 to firmly nest within the ejector sleeve extension 7. Above the mounting ring 31 is a base portion 26 which has thicker side-walls than the sleeve end portion 24 to add to the strength of the sleeve. The sleeve 5 has a central bore 42 dimensioned to receive a core pin of a given diameter. The thickness (dimension 35 shown in FIG. 14) of the side-walls defining the sleeve end portion 24 ranges from about 0.020 (20 thousandths) to about 0.040, (40 thousandths) and preferably about 0.030 (30 thousandths) of an inch. In contrast, prior stock sleeves had side-wall thicknesses which ranged from about 0.046 to about 0.125 of an inch.

The sleeve extension 7 of one embodiment of the invention is shown in FIGS. 5, 6 and 7. As can be seen in FIG. 6, the ejector sleeve extension 7 has an extension shoulder 29 and a first bore 30 dimensioned to receive the shaft 3 of the core pin 1. The extension shoulder 29 is adapted to be received in an extension pocket 15 machined into the ejector plate 45 and core mold half 40. The first bore 30 is contiguous with the T-slot 4 which is dimensioned to receive the mounting ring 31 of the ejector sleeve extension 7. A second bore 32 is formed in the upper portion of the ejector sleeve extension 7 and is dimensioned to receive the base portion 26 of the ejector sleeve 5. FIG. 7 shows the ejector sleeve extension 7 in cross section and illustrates that the T-slot 4 extends through one exterior wall of the sleeve so that ejector sleeve 5 can be slid into place in the T-slot 4 and second bore 32 within the ejector sleeve extension 7. FIGS. 1 and 2 show the extension pocket 15 formed in the core mold half 40 and ejector plate 45 for receiving the sleeve extension 7, ejector sleeve 5, as well as the core pin 1. By use of the sleeve extension in embodiments of the invention illustrated in FIGS. 1, 2, 3, 6, 7 and 9, it has been found that a very thin ejector sleeve having side wall thickness on the order of 0.030 of an inch may be used without excessive wear or damage to the sleeve, core pin or mold. Using such a sleeve extension, applicant has successfully tested and used sleeves and sleeve extension having a total height (dimension 34 in FIG. 2) in excess of 6 inches.

A single aperture 12 is machined by the end user having a first, second and third diameter to accommodate the core pin, sleeve, and mounting plug within the mold. The three aperture diameters are machined to closely match the two outside diameters of the mounting plug 9 and the outside diameter of the sleeve 5. The aperture 12 typically will be formed in three basic steps by machining three bores of differing diameter, a sleeve bore 14 dimensioned to receive the sleeve 5, a plug bore 13 dimensioned to receive a standard pin head 2 and plug body 27, and a plug shoulder bore 20 dimensioned to receive a plug shoulder 17. The core pin 1 extends through the core pin bore 6 in the mold section which is continuous with the single aperture 12, and the mounting plug 9 is threaded into the aperture 12. The plug 9 has a plug shoulder 17 formed between plug head 21 and threaded exterior cylindrical surface 16. The depth of the plug bore 13 is machined to slightly exceed the combined height of the plug 9 and pin head 2 as shown in dimension 28 on FIG. 4. When the mounting plug 9 is threaded flush into the plug bore 13 the plug head 21 contacts the stop surface 18 of the plug shoulder bore 20. The space left around the pin head 2 includes the head clearance 10, which will typically measure from about one to three thousandths of an inch. This head clearance 10 is sufficient to allow the core pin 1 to move forward and back, that is, float in the mount which can assist in preventing damage to the pin 1 and or sleeve 5 during installation and operation.

As seen in FIG. 1, the core pin 1 extends through the ejector plate 45 when assembled. Core pin 1 is passed through the sleeve extension 7 and ejector sleeve 5. The sleeve extension 7 is mounted in the ejector plate 45. The ejector sleeve 5, as can be seen best in FIG. 3, is mounted upon the ejector sleeve extension 7. The sleeve extension 7 provides structural support for the sleeve 5. It is contemplated that the core pins of the present invention may be used without the use of an extension. This would be particularly appropriate where the length of the sleeve is less than four inches. For applications with a relatively long ejection stroke, it is contemplated that a sleeve longer than four inches may be needed and a sleeve extension would commonly be used.

The mounting plug 9 of the present invention can be best seen in FIGS. 10 and 11. The body 27 of the mounting plug 9 has a threaded exterior cylindrical surface 16, and hexagonal recess 23. The plug body 27 extends to a plug head 21 with a larger diameter and a plug shoulder 17 which is adapted to engage the stop surface 18 of the plug shoulder bore 20. The top view of the retaining bolt, as seen in FIG. 10, shows the hexagonal recess 23 which is provided for tightening and loosening the retaining bolt with a hex-wrench tool, and a plug shoulder 17, which when mounting plug 9 is threaded into the aperture, is flush with the press piece 43a which houses the mounting plug depicted in FIG. 4. The aperture 12 is machined to have a stop surface 18 for engaging the plug shoulder 17 when the plug is threaded and fully tightened. The depth of the plug shoulder bore 20 and consequently the position of the stop surface 18 are correlated to the height of the plug shoulder 17 so that, when fully tightened down, the surface of head 21 is flush with the exterior of the mold.

In one embodiment of the invention, a novel mounting system is provided for securing core pins, coring members, and other mold components. This system is best understood with reference to the two types of prior mounting systems typically used which are shown in FIGS. 12 and 13. The first type seen in FIG. 13 has a threaded aperture 65 and a retaining bolt 63 which is threaded through the aperture to mount the core pin 67 tightly against the surface of the press piece 43c. The aperture 65 includes a stop surface 64 of lesser diameter which corresponds closely in diameter to the core pin. The shoulder 68 of the head 69 of the core pin 67 engages the stop surface 64 when the bolt 63 is tightened into the threaded aperture 65. This mechanism typically holds the pin 1 rigidly, which increases the likelihood that the long narrow pin will fracture or break during installation or use. The bolt has a recess 66 for receipt of a hex-wrench or similar mechanism for tightening the bolt 63 in the threaded aperture 65.

The second type of mount seen typically used is shown in FIG. 12. This mounting system uses a mounting plate 55 held to the press piece 43b by a mounting screw 53 in a threaded aperture 60 that must be machined into the press piece 43b. The mounting plate 55 is placed into an aperture 59 machined into the press piece 43b. The aperture 59 for the mounting plate is typically large in comparison with the core pin 1 and core pin head 2 and is rectangular in shape as shown in FIG. 12. A head pin aperture 52 is formed in the press piece 43b for receiving the head 59a of the pin 57. The shoulder portion 58 of the pin 57 is not pressed flush against the stop surface 54 so that a head space 61 is created which allows a floating mount. Forming these multiple apertures in the press piece requires multiple machining steps and can require the use of multiple pieces of machining or drilling equipment. Moreover, the relatively large, rectangular mounting plate 55 takes up more space on the press piece than is desirable since such space is customarily at a premium. Again, the large number of steps increase the cost of manufacturing the mold.

The novel mounting system of this embodiment of the invention is shown in FIGS. 1–4. The mounting system provides head clearance 10 for a floating mount but can be installed in a greatly simplified procedure which requires a single aperture 12 having surfaces with a first, second and third diameter. The three diameters are machined to closely match the two diameters of the mounting plug 9 and the outside diameter of the sleeve 5. The aperture 12 is machined to have a plug bore 13 which has a threaded cylindrical surface 11 for receiving and engaging the threaded exterior surface 16 of the mounting plug 9. Mounting plug 9 has a plug body 27 which has a diameter similar to the diameter of the pin head 2. These two diameters correspond to the diameters to be drilled or machined into the mold section to form the plug bore 13 which received the plug to retain the pin head 2 of the core pin. The mounting plug has a plug shoulder 17 which has a larger diameter than the plug body 27. A plug shoulder bore 20 is machined into the press piece 43a which is dimensioned to receive the plug shoulder 17 in a flush mount relationship. It is contemplated that the novel core element mounting system shown in FIGS. 1–4 may be used to mount core elements other than core pins, such as, core blades as well as other mold components, e.g., ejector blades or ejector pins.

In practice, core pins typically come in standard lengths and are machined and cut by the end user to correspond with the design for the mold itself. The pins have a pin head 2 which rests within and is engaged by the aperture 12 in the press piece 43a. As depicted in FIG. 3, in this example, the end of the core pin 1 is machined by the end user to form a shaft shoulder 22 which correspond in part with the width of the walls of the raised aperture 48 to be formed in the molded article 46. In the embodiment depicted in FIG. 14, the width (dimension 49) of the walls 34 of the raised aperture 48 is approximately equal to the sum of the cross sectional, diameter (dimension 71) of the shoulder 22 and the width (dimension 35) of the hollow sleeve 37 of the ejector sleeve 5, as seen in FIG. 3. However, it is recognized that end users can also opt to select a thinner core pin, machine a smaller diameter cavity in the mold halves 39 and 40, and set the width (dimension 49) of the walls 34 of the raised aperture 48 and lip 36 as the width (dimension 35) of the ejector sleeve. Also, the end users often taper these parts, in particular to provide the pin with taper which is commonly referred to as draft, and machine a correspondingly shaped cavity into the mold sections, in place of the cylindrical cavities, and pins depicted herein.

In accord with the present invention, the width (dimension 49) of the walls 34 of the raised aperture 48 may be decreased to save on material costs as well as cycling time for the injection molding process. As best depicted in FIG. 2, these narrower walls correspond to the thinner ejector sleeve 5, whose walls 34 have a reduced thickness. Again, it is contemplated a thinner core pin 1 could be selected to thread through a narrower aperture in the mold halves 39 and 40, in machining a slightly longer shaft end 3a, leaving a narrower pin shoulder 22, or no pin shoulder at all. This would likewise have the effect of narrowing the walls 34 of the raised aperture 48 while maintaining the same size of the cavity 51 of the raised aperture 48.

During the injection mold process, after the mold sections and press piece are assembled, hot or thermosetting plastic is injected into the mold, the plastic cools or sets, and the piece is ejected. FIG. 1 depicts the assembled mold just after injection of hot or thermosetting plastic. FIG. 2 depicts the ejection of the molded article 46 just after the article has cooled or set.

As seen in FIG. 1, the molten plastic or thermosetting material which forms the molded article 46 has surrounded the pin tip 3 to fill in the cavity between the core pin tip 3 and the mold half 40. This molten plastic or thermosetting material abuts the exterior lip 56 of the ejector sleeve end 24. When the shaft end 3a of the core pin 1 is machined to a smaller diameter as well, the material also abuts the shoulder 22 of the core pin 1. The pin head 2 rests within the head cavity 8 formed by the press piece 43a and the mounting plug 9. The head clearance 10, (FIG. 4), allows the ejector sleeve 5 to travel through the mold half and 40 without deforming (not shown). The ejector plate 45 is adjacent to the press piece 43a, and the ejector sleeve S and ejector sleeve extension 7, which are correspondingly mounted on the ejector plate 45, follow core pin 1 along its length up to the machined shoulder 22 so that the lip 56 of the sleeve end 24, is adjacent to the core pin shoulder 22. The walls of the ejector sleeve 24 travel through the core mold half 40 and fill the cavity left between the core pin and the cavity in the mold half 40, to prevent molten material from flashing, i.e., escaping around the edges of the ejector sleeve 5. In the exemplar ejection cycle depicted in FIG. 2, the ejector plate 45 has traveled upwardly to its full extent, the ejector sleeve is also extended upwardly, and the ejector sleeve 5 now extends past the part line 44 into the mold cavity 50. As can be best seen in FIG. 2, the aperture 51 formed in the now cured molded article 46 has walls 47 (after allowing for shrinkage) which have a width equal to the width of the ejector sleeve wall 24 and the core pin shoulder 22 combined.

To decrease cycling time by reducing the amount of hot molten material, and to save on material costs, the present invention also embodies an improved method of molding an article having a raised aperture 48 in the molded article 46. This method employs the step of first machining in an injection mold half as single aperture dimensioned to receive a mounting plug 9, ejector sleeve 5, and core pin 1. The core pin 1 is mounted to the press piece 43a of an injection mold by means of a mounting plug 9. The ejector sleeve is placed over the core pin 1 and mounted to the ejector plate 45. The injection mold is caused to move to a closed position and molten plastic is injected into the mold cavity such that the core pin, mold halves, and ejector sleeves form a molded article with a raised aperture. This method provided for a more durable ejector sleeve even when very thin sleeves are used. The ejector sleeve extension 7 may have thinner walls to correspond to a narrower gap between the shaft end 3 and the mold piece cavity 50. To prevent a thin sleeve extension piece from becoming damaged as it travels through the mold, the pin may be mounted as seen in FIG. 4, to provide a head clearance 10.

In one preferred embodiment of the invention, the thin wall sleeve is coated with a uniform coating of a hard material such as chromium, nickel or alloys thereof having a very uniform thickness of between about 0.0001 and 0.00001 with no substantial build-up of the coating on the sharp edges or corners of the piece. The preferred ejector sleeves are made of A-2 steel with a surface hardness of 58–60 RC and a surface finish of 4–10 RMS. Preferably, the sleeve is treated with a uniform coating of an electroless nickel treatment sold under the tradename Nicklon® by Bales Mold Service, Inc., 2824 Hitchcock Avenue, Downers Grove, Ill. 60515. This surface coating provides excellent corrosion resistance and lubricating characteristics to the thin walled sleeves of the invention. The Nicklon® composition is believed to include 80–83% by weight nickel, 1–11% by weight phosphorus and 8–9 by weight polytetrofluourethylene. The co-efficient friction of the Nicklon® surface treating believed to be approximately 0.2 when analyzed using ASTM standard testing procedure D-2714. The Nicklon® coating is deposited on stock nominal length pins in a process which is proprietary to Bales Mold Service, Inc. that results in homogenous distribution of autocatalytic nickel and PTFE. The Nicklon® coating is designed to provide continual renewal of PTFE at the wear surface of the sleeve as the sleeve undergoes normal wear during use in an injection mold. The use of Nicklon® and other nickel-containing alloys over chromium alloys as indicated were superior corrosion resistance is desired. Several plastic resins used is the injection molding industry give off corrosive gases as they cure in the mold. The most commonly used of such resins in polyvinylchloride. The corrosive gases are known to react with chromium and chromium alloy coated surfaces in injection molds. Thus, for certain applications, chrome coated ejector sleeves are not desirable.

The thin wall sleeves of the present invention are typically manufactured and stocked in standard or nominal sizes such as 4 and 6 inches and are cut and deburred to size by the mold maker. With conventional sleeves, it has been standard practice for mold makers to cut and grind a sleeve to the desired size and then send the pin out for custom coating in small batches. This process was used since experience taught mold makers that surface coatings typically flaked or chipped during the cutting and deburring process. It has been found that the use of such very thin coating or chromium or nickel on the thin wall sleeves of the present invention can survive the cutting and deburring process such that those sleeves can be pre-coated in large batches prior to cutting without any further need to coat or treat the sleeve afterward. This can yield a significant cost savings to the mold maker.

Optionally, the core pin for use with the sleeve may be coated with a nickel or chromium alloy coating. A particularly advantageous coating is sold by the tradename Nihard™ also by Bales Mold Service, Inc. The Nihard™ coating includes 48% by weight cobalt with the balance believed to be substantially nickel. The Nihard™ coating is pre-coated on standard core pins by a proprietary autocatalytic application process which does not require electroplating of the pins. Another advantage of the Nihard™ coating is that it is superior to chromium alloys for corrosion resistance as well as being substantially less costly than chromium-coated materials.

Figure 15:
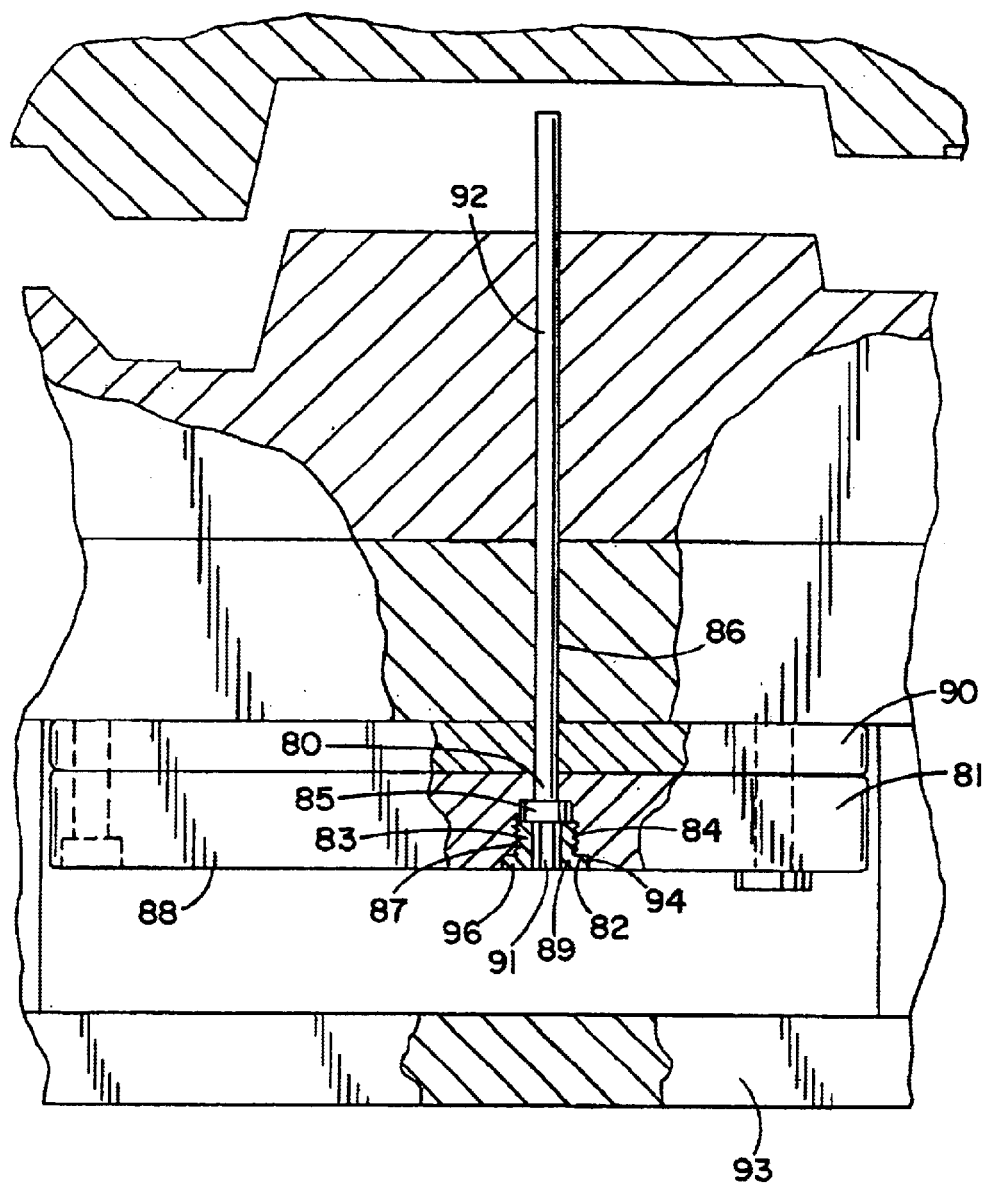
FIG. 15 is a cross-sectional view of the mold shown during opening of the mold to replace the worn ejector pins with an ejector pin mounted in the ejector plate using the novel mounting plug of one embodiment of the invention.

As shown in FIG. 15 in a still further embodiment of the invention, the mold mounting plug 82 is used to provide a floating mount of an ejector pin 80 in the ejector plate 81. The method for installing the ejector pin in the ejector plate is substantially the same as explained above for mounting the core pin in the single aperture with first, second and third diameters. Likewise, the ejector plate and other mold plates are provided with a single continuous aperture with three diameters to mount and accommodate the ejector pin. The single aperture 86 is machined to form an ejector pin bore 92 having a first smaller diameter. The second diameter is machined to closely match the diameter of the mounting plug body 83 and the outside diameter of the head 85 of the ejector pin 80. The single aperture 86 is machined to have a plug bore 84 which has a threaded surface 87 for receiving and engaging the exterior 89 of the mount plug 83. The single aperture 86 is machined to have a third, wider diameter bore 94 for accommodating the shoulders 96 of the mold plug 82. The ability to mount the core pin in the exterior surface 88 of the ejector plate 81 greatly simplifies removal and replacement of ejector pins that become either worn or damaged dung use in the injection mold.

This process is accomplished by the operator jogging the mold into an open position in which the ejector pin is substantially extended into the mold cavity such that a space is provided between the exterior surface 88 of the ejector plate 81 and the mold base 93. This space allows the operator of the mold to easily replace ejector pins without having to disassemble the mold to remove the pin plate 90 from the ejector plate 81 as is commonly done with conventional ejector pins. The ejector pin 80 is easily removed by insertion of a driving device into the driving surface of the hexagonal recess 91. The plug is rotated to loosen it and remove it from the ejector plate 81. The core pin 80 can be easily tapped from the open mold cavity to assist in removing it from the mold if it binds. In a similar manner, a replacement ejector pin can then be inserted into the single aperture until the ejector pin head is located within the ejector plate. The mounting plug is then inserted into the threaded bore and rotated by means of a suitable driving device in hexagonal recess until filly tightened.

The foregoing description and figures are intended as an illustration of the invention, and are not to be construed as containing or implying limitations upon the invention. It will be appreciated that although various aspects of the invention have been described with respect to specific embodiments, alternatives and modifications will be apparent from the present disclosure which are within the spirit and scope of the present invention as set forth in the following claims.

What is claimed:

1. An improved ejector sleeve for molding a raised aperture in a molded article formed within a mold having an ejector plate and a core pin, the ejector sleeve comprising:
a base portion located at a first end of the ejector sleeve for mounting the sleeve to the ejector plate of the mold;

a tube portion extending from the base to a second end of the ejector sleeve, the tube having and inner surface defining a central bore for receiving the core pin and an outer surface defining the exterior of the tube;

a lip located at a second end of the ejector sleeve for forming at least a portion of the raised aperture in the molded article; the width of the lip being defined as the distance between the inner surface and outer surface of the tube at the lip, the width of said lip being between about thirty thousandths of an inch and about forty thousandths of an inch.

2. The improved ejector sleeve of claim 1 wherein the width of the lip is between about twenty thousandths of an inch and thirty thousandths of an inch.

3. The improved ejector sleeve of claim 1 wherein at least a portion of the surface of the sleeve is coated with a surface coating having a thickness of less than 0.0001 of an inch of a material selected from the group consisting of nickel, chromium, alloys of nickel and alloys of chromium.

4. The improved ejector sleeve of claim 3 wherein said coating is an alloy of nickel which further includes phosphorus and polytetrafluoroethylene.

5. An improved ejector sleeve and core pin system for molding a raised aperture in a molded article formed within a mold having an ejector plate, the system comprising:

(1) an ejector sleeve including, (a) a base portion located at a first end of the ejector sleeve for mounting the sleeve to the ejector plate of the mold, (b) a tube portion extending from the base to a second end of the ejector sleeve, the tube having and inner surface defining a central bore and an outer surface defining the exterior of the tube, and (c) a lip located at a second end of the ejector sleeve for forming at least a portion of the raised aperture in the molded article; the width of the lip being defined as the distance between the inner surface and outer surface of the tube at the lip, the width of said lip being between about thirty thousandths of an inch and about less than about forty thousandths of an inch;

(2) an core pin having a first end with a head adapted to be retained in a cavity formed in the mold base and a second end dimensioned for receipt within the central bore of the ejector sleeve and having a pin tip which defines at least a portion of the raised aperture when the mold is closed; and (3) a plug having a base with (a) a shoulder for engaging a stop surface in an core pin aperture formed in the mold, (b) a threaded exterior surface for engaging a threaded surface in the aperture formed in the mold, (c) a driving surface for engagement with a rotating driving tool to tighten the mounting plug into position, and (d) a core pin contacting surface for supporting a surface of the core pin within the core pin aperture.

6. The system of claim 5 further comprising a sleeve extension for receipt of the ejector sleeve having a first end and a second end, the first end of the sleeve extension having a base portion adapted to mount to an ejector plate, the second end of the sleeve extension having a slot for receiving the base of the ejector sleeve, and a tube portion extending between the base and slot and defining a through bore dimensioned to receive the core pin.

7. The system of claim 5 wherein the width of the lip is further defined as the difference between the external diameter and internal diameter of the tube at the lip.

8. The system of claim 5 wherein the width of the lip is less than thirty thousandths of an inch.

9. The system of claim 5 wherein at least a portion of the surface of the sleeve is coated with a coating having a thickness of less than 0.001 of an inch of a metal compound selected from the group consisting nickel, chromium, alloys of nickel and alloys of chromium.

10. A sleeve extension for receipt of an ejector sleeve comprising:

a base located on a first end of the sleeve extension and being adapted to mount to a slot formed in one of an ejector plate or pin plate;

a slot located on a second end of the sleeve extension for receiving a base portion of an ejector sleeve;

and a tube portion extending between the base and slot and defining a through bore dimensioned to receive the ejector sleeve and a core pin.

11. An injection mold having an improved ejector pin retaining system comprising:

a first mold portion having surfaces defining a portion of a mold cavity; a second mold portion having surfaces defining a portion of a mold cavity, the first and second mold portions being moveable between an opened position to eject a molded article and a closed position to mold the plastic article;

an ejector plate located within one of the first and second mold portions for providing reciprocal motion in a direction opposite to the movement of the first and second mold portions, the ejector plate having an aperture formed in an exterior surface, the aperture having a stop surface, and an interior threaded portion formed therein; an ejector pin having a first end with a head adapted to be retained in an aperture formed in an exterior surface of the ejector plate and a second end including a molded article contacting surface, the article contacting surface contacts a portion of the molded article when the mold opens to assist in ejection of the molded article from the mold;

and a retaining plug for providing a floating mount including, (a) a base with a shoulder for engaging the stop surface within the aperture in the ejector plate, (b) a threaded exterior surface for engaging the threaded interior surface within the aperture formed in the ejector plate, (c) a driving surface for engagement with a rotating driving tool to tighten the mounting plug into position, and (d) an ejector pin contacting surface for supporting the surface of the ejector pin within the aperture in the ejector plate.

12. An improved ejector sleeve for molding a raised aperture in a molded article formed within a mold having an ejector plate and a core pin, the ejector sleeve comprising:

a base portion located at a first end of the ejector sleeve for mounting the sleeve to the ejector plate of the mold;

a tube extending from the base to a second end of the ejector sleeve, the tube having and inner surface defining a central bore for receiving the core pin and an outer surface defining the exterior of the tube;

a lip located at a second end of the ejector sleeve for forming at least a portion of the raised aperture in the molded article; the width of the lip being defined as the distance between the inner surface and outer surface of the tube at the lip, the width of said lip being between about one thousandth of an inch and about forty thousandths of an inch; and a thin surface coating of a metallic material applied to at least a portion of the tube, the thin surface coating providing increased lubricity to the tube for low friction reciprocal movement of the sleeve between an extended and retracted position.

13. The improved ejector sleeve of claim 12 wherein said thin surface coating is a substantially uniform, lubricious coating with a thickness of less than about 0.0001 inch covering at least a portion of the tube and wherein the thin surface coating is applied prior to cutting of the lip of the sleeve of the ejector to shorten the sleeve to a desired length and deburring of the peripheral edge of the sleeve.

14. The improved ejector sleeve of claim 12 in which the thickness selected for the thin surface coating such that the thin surface coating remains substantially intact at the cut and deburred lip of the sleeve after cutting and deburring thereof.

15. The improved ejector sleeve of claim 12 wherein the thin surface coating has a thickness of less than 0.0001 of an inch and wherein the metallic material is selected from the group consisting of nickel, chromium, alloys of nickel and alloys of chromium.

16. The improved ejector sleeve of claim 12 wherein said thin surface coating is an alloy of nickel which further includes phosphorus and polytetrafluoroethylene.

17. The sleeve extension of claim 10 wherein the slot is a T-slot formed on the second end of the sleeve extension and wherein the T-slot is dimensioned to slidingly receive and retain the base portion of the ejector sleeve.

* * * * *